INVENTOR
EVERETT H. WHITE
BY
G. H. Braddock
ATTORNEY

June 22, 1943.　　　　E. H. WHITE　　　　2,322,405
AIR CONDITIONING SYSTEM
Filed April 27, 1940　　　2 Sheets—Sheet 2
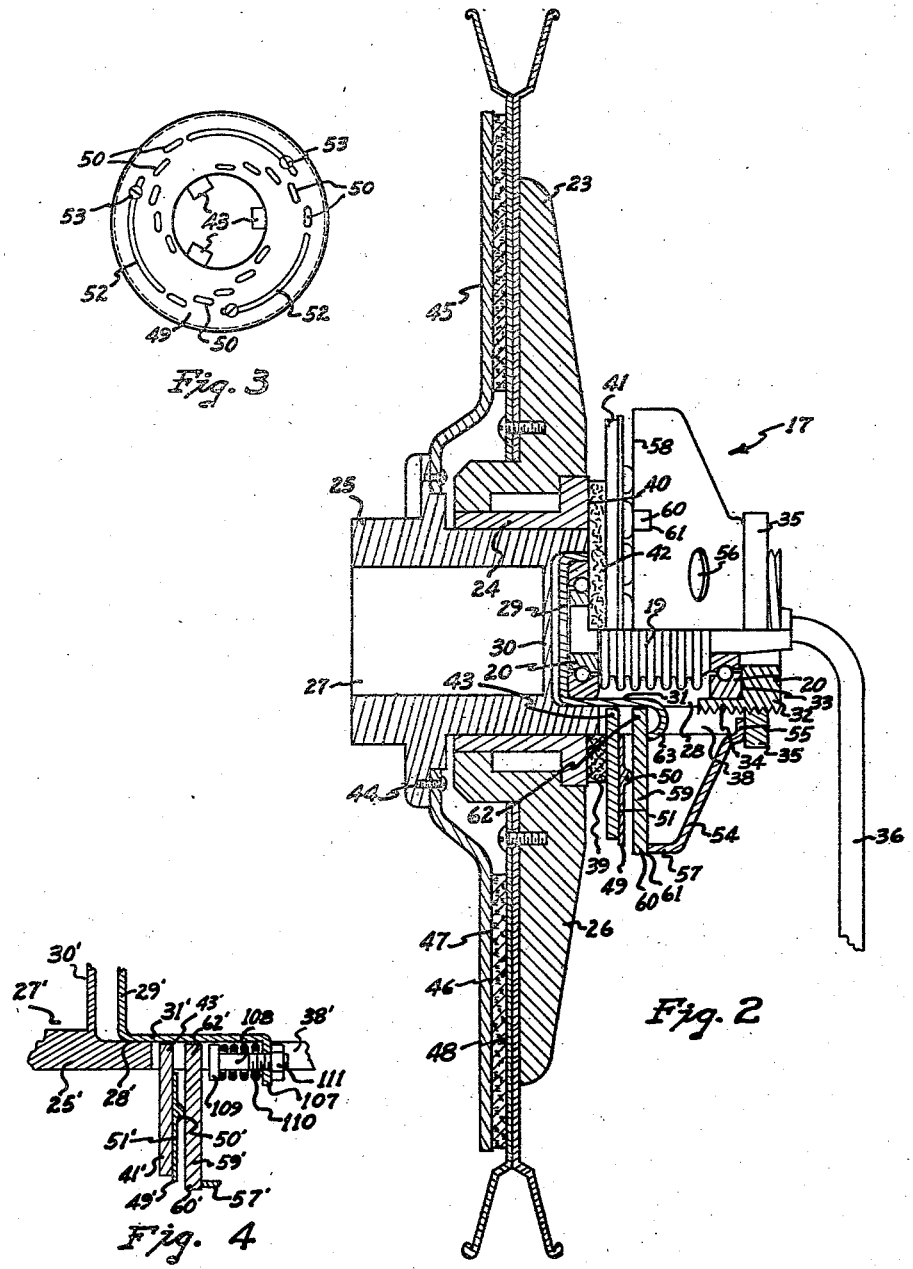
INVENTOR
*EVERETT H. WHITE*
BY
*G. H. Braddock*
ATTORNEY Patented June 22, 1943

2,322,405

UNITED STATES PATENT OFFICE 2,322,405

AIR CONDITIONING SYSTEM

Everett H. White, St. Paul, Minn.

Application April 27, 1940, Serial No. 332,085

15 Claims. (Cl. 236—11)

This invention relates to an air conditioning system of the general type as disclosed in U. S. Letters Patent No. 2,158,250, for Air conditioning systems, granted May 16, 1939, to Claude H. Peters.

An object of the invention is to provide an air conditioning system which will include novel and improved mechanism through the instrumentality of which the velocity and volume of air forced to and through a hood or plenum chamber of the air conditioning system will be progressively changed through a wide range of values in proportion to the temperature in such hood or plenum chamber.

A further object is to provide in the air conditioning system a multiple speed drive of novel and improved construction for a fan or blower of said air conditioning system adapted to be controlled and regulated by a heat responsive element of the system.

A further object is to provide in the air conditioning system a multiple speed drive of the nature as stated, and means through the instrumentality of which adjustment of said multiple speed drive can be accomplished.

A further object is to provide in the air conditioning system novel and improved mechanism through the instrumentality of which the speed of rotation of a fan or blower of said air conditioning system can be altered to correspond accurately with changes in the temperature of air in the plenum chamber or air duct of the system.

A further object is to provide in the air conditioning system mechanism through the instrumentality of which the speed of rotation of a fan or blower of said air conditioning system can be altered in response to changes in temperature of a heat responsive element of the system, and means for adjusting said mechanism to cause the rate of alteration of the speed of rotation of said fan or blower due to temperature changes of said heat responsive element selectively to be varied.

A further object is to provide in the air conditioning system a variable speed control for a blower of the system which will be of novel and improved construction.

A further object is to provide in the air conditioning system a variable speed friction control for a blower adapted to be adjusted by a heat responsive mechanism of said system in such manner as to cause the friction of the control to be altered in response to changes in temperature of the heat responsive mechanism, thus to alter the speed of said blower, and a manually adjustable means for causing the rate of alteration of the friction of said control due to temperature changes of the heat responsive mechanism selectively to be varied.

A further object is to provide in the air conditioning system a variable speed friction drive for a blower adapted to be actuated and adjusted by a heat responsive mechanism of said system in such manner as to cause the friction of the drive to be altered in response to changes in temperature of the heat responsive mechanism, thus to alter the speed of said blower, and a manually adjustable means, designed to the purpose of obtaining desired and proper speed of the blower of the system under varying conditions in commercial practice, for causing the rate of alteration of the friction of said drive due to temperature changes of the heat responsive mechanism selectively to be varied.

A further object is to provide in the air conditioning system mechanism, including a bellows or expansible member and/or bearing members, through the instrumentality of which the speed of rotation of a fan or blower of said air conditioning system can be altered in response to changes in temperature of a heat responsive element of the system, and a construction and arrangement, or devices, adapted to the purpose of affording protection for said bellows and/or bearing members against the possibility that these might, or could, otherwise become damaged.

A further object is to provide an air conditioning system which will include mechanism through the instrumentality of which the speed of rotation of a fan or blower of said air conditioning system can be altered in response to changes in temperature of a heat responsive element of the system, and novel and improved mechanism through the instrumentality of which a motor, for actuating said fan or blower and constituted as a part of said first mentioned mechanism, selectively can be rendered operative or inoperative.

A further object is to provide an air conditioning system which will include a burner, mechanism through the instrumentality of which the speed of rotation of a fan or blower of said air conditioning system can be altered in response to changes in temperature of a heat responsive element of the system, and mechanism through the instrumentality of which said burner selectively can be rendered operative or inoperative.

And a further object is to provide an air conditioning system which will include a burner, mechanism through the instrumentality of which the speed of rotation of a fan or blower of said air conditioning system can be altered in response to changes in temperature of a heat responsive element of the system, and mechanism through the instrumentality of which said burner and a motor, for actuating said fan or blower and constituted as a part of said first mentioned mechanism, selectively can be rendered operative or inoperative in response to temperature changes of said heat responsive element.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and intended in no way in a limiting sense, changes in details of construction and arrangement of parts being permissible so long as within the spirit of the invention and the scope of the claims which follow.

In the accompanying drawings forming a part of this specification,

Fig. 2 is a view, partially in section and partially in elevation, detailing mechanism of the air conditioning system through the instrumentality of which the speed of rotation of the fan or blower of said air conditioning system is controlled and regulated;

Fig. 3 is a plan view, on a reduced scale, detailing an adjustable or movable element or annular disc of the mechanism of Fig. 2;

Figure 5:
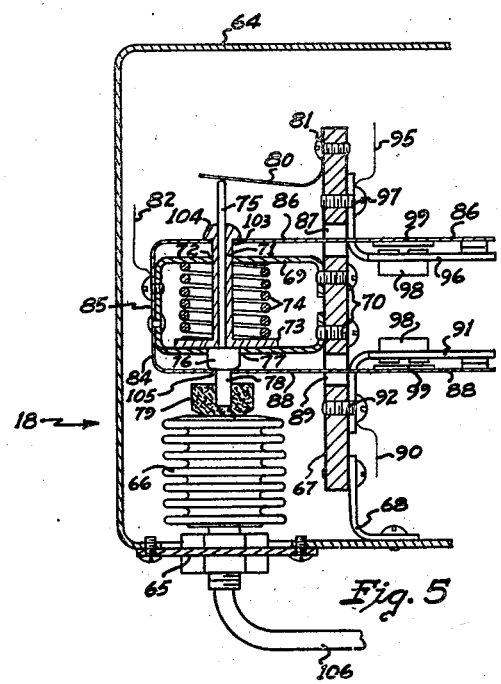

Fig. 4 is a view, partially in section and partially in elevation, detailing a modified form of mechanism for controlling and regulating the speed of rotation of the fan or blower of the air conditioning system, the present view disclosing a construction and arrangement, or devices, omitted from Fig. 2, adapted to the purpose of protecting the bellows and bearing members as in said Fig. 2 against the possibility of damage; and Fig. 5 is a sectional view detailing mechanism of the air conditioning system through the instrumentality of which the fan or blower motor and the burner, respectively, of said air conditioning system are rendered operative and inoperative, the present view also disclosing a construction and arrangement, or devices, equivalent to the construction and arrangement, or devices, as in Fig. 4, adapted to the purpose of protecting the bellows and bearing members of Fig. 2 against the possibility of damage.

With respect to the drawings and the numerals of reference thereon, 10 denotes a heating plant or furnace of common or preferred construction, 11 a burner for supplying heating medium to the combustion chamber (not shown) of said heating plant or furnace, 12 a heater casing of the heating plant or furnace providing a hood or plenum chamber 13 in surrounding relation to said combustion chamber, 14 outlet ducts leading from said hood or plenum chamber, as, for example, to a space or room to be heated, 15 a blower for forcing air to and through the hood or plenum chamber 13 into the outlet ducts 14, and 16 represents an electric motor for actuating or driving the blower 15.

The air conditioning system includes mechanism, denoted generally at 17, for altering the speed at which the blower 15 is caused to be rotated from time to time by the electric motor 16 in response to changes in temperature of a heat responsive element of said air conditioning system, thus to alter the velocity and volume of air forced to and through the hood or plenum chamber 13 and the outlet ducts 14, and said mechanism 17 includes means whereby it can be adjusted to cause the rate of alteration of the speed of rotation of said blower due to temperature changes of said heat responsive element selectively to be varied, thus to cause the rate of alteration of the velocity and volume of air forced to and through the hood or plenum chamber and the outlet ducts to be correspondingly varied. Also, said air conditioning system includes mechanism, denoted generally at 18, for rendering each of the electric motor and the burner 11 operative and inoperative in response to temperature changes of the heat responsive element of the air conditioning system, and said mechanism 18 includes a construction and arrangement, or devices, for protecting a flexible bellows 19 and/or anti-friction bearing members 20, 20 of the mechanism 17 against the possibility of damage. That is, the mechanism 18 incorporates a construction and arrangement, or devices, adapted to the purpose of affording protection for said bellows 19 and said bearing members 20, 20 against the possibility that these might, or could, otherwise become damaged during practical operation of the air conditioning system.

The blower 15 is driven by the electric motor 16 through the medium of a belt 21 which rides the motor shaft 22 and also rides a driven pulley 23 which is rigid with a self-oiling bushing 24 revoluble upon a blower driving shaft 25 suitably and conveniently mounted in the blower casing. Desirably, the driven pulley 23 includes radial vanes 26 which impart rigidity thereto, and also serve as fan blades adapted to cause heat to be removed from the vicinity of said driven pulley as this is caused to rotate.

The blower driving shaft 25 includes a concavity 27 in its inner end portion in which a fan or blower supporting shaft (not shown) is adapted to be rigidly secured, and also includes a concavity 28 in its outer end portion which houses the flexible bellows 19 and the anti-friction bearing members 20, 20.

The base 29 of a cup-like member is situated in the inner end portion of the concavity 28 in contiguous relation to the inner anti-friction bearing member 20 and in spaced relation to a transverse member or wall 30 of the blower driving shaft 25, between said inner anti-friction bearing member and said transverse member or wall, and the side wall 31 of said cup-like member is rigidly secured about and upon the peripheral surface of the inner anti-friction bearing member 20 in slidable relation to the internal cylindrical surface of the blower driving shaft which defines said concavity 28. The transverse member or wall 30 separates the concavities 27 and 28. A hollow nut 32, adjustably threaded into the outer end of the blower driving shaft 25, includes a transversely extending annular shoulder 33 thereof in contiguous relation to the outer anti-friction bearing member 20, and a cylindrical wall 34 thereof, extending inwardly from said shoulder 33, rigidly secured about and upon the peripheral surface of said outer anti-friction bearing member. A hollow lock nut 35 upon the externally threaded surface of the hollow nut 32 is adapted to be turned down against the adjacent or outer end of the blower driving shaft 25, as disclosed in Fig. 2, to lock said hollow nut at any position to which adjusted in said blower driving shaft.

An expansible fluid of ordinary or preferred kind is confined in the flexible bellows 19 and in a small pipe 36 and a container 37 situated in the hood or plenum chamber 13. The small pipe 36 connects said flexible bellows 19 and container 37 with each other, and the bellows is of the type which is expanded by increase of pressure in the fluid therein.

The outer end portion of the blower driving shaft 25 includes a plurality of longitudinally disposed, elongated slots 38 each of which extends along the concavity 26, from position adjacent the inner anti-friction bearing member 20 to the end of said blower driving shaft in the illustrated embodiment of the invention. Desirably, there may be three elongated slots 38 spaced 120 degrees apart.

An annular friction disc 39, in surrounding relation to the blower driving shaft 25, has a flat inner surface thereof arranged in contiguous relation to a flat outer surface 40 of the bushing 24 disposed in a plane perpendicular to the axis of said blower driving shaft. An annular disc 41, also in surrounding relation to the blower driving shaft, has a flat inner surface thereof arranged in contiguous relation to a flat outer surface 42 of the annular friction disc 39 disposed in a plane perpendicular to the blower driving shaft axis. Said annular disc 41 includes spaced apart, inwardly extending lugs 43 at its inner periphery situated, respectively, in the elongated slots 38. That is, the construction and arrangement are such that the annular disc 41 is fixed to rotate with the blower driving shaft 25 and to be movable longitudinally of said shaft, toward and away from the annular friction disc 39, and said annular friction disc 39 is situated between said annular disc 41 and the bushing 24.

The blower driving shaft 25 rigidly supports, as at 44, a second annular disc 45, of considerably greater area than the annular disc 41, situated at the side of the driven pulley 23 opposite said annular disc 41. A second annular friction disc 46, in surrounding relation to the blower driving shaft, has a flat inner surface thereof arranged in contiguous relation to a flat outer surface 47 of the second annular disc 45 disposed in a plane perpendicular to the axis of said blower driving shaft, and a flat outer surface thereof arranged in contiguous relation to a flat inner surface 48 of the driven pulley 23 disposed in a plane perpendicular to the blower driving shaft axis. That is, the second annular friction disc 46 is situated between the second annular disc 45 and the driven pulley 23. It may be fixed to either said second annular disc or to said driven pulley, but not to both.

The annular disc 41 supports an adjustable or movable element or third annular disc 49 which is clearly disclosed in Figs. 2 and 3, and said adjustable or movable element or third annular disc includes a plurality of separate sets of spaced apart protuberances 50. More explicitly, the third annular disc 49 includes a flat inner surface thereof slidably rotatable over a flat outer surface 51 of the annular disc 41 disposed in a plane perpendicular to the axis of the blower driving shaft 25, and the spaced apart protuberances 50 are upon the outer surface of said third annular disc, opposite the annular disc 41. In the disclosure as made, the third annular disc 49 includes a plurality, three as shown, of equally spaced elongated arcuate slots 52, and screws 53, one in each arcuate slot, are situated in the arcuate slots and in the annular disc 41. The construction and arrangement are such that the screws 53 can be loosened to allow the third annular disc 49 to be rotated to any selected and predetermined adjusted position and tightened down to securely fasten said third annular disc against said annular disc 41 at position to which adjusted. Evidently, the adjustable or movable element or third annular disc 49 when fastened down is fixed to have movement as a unit with the annular disc 41. The protuberances 50 are for a purpose to be explained. In the illustrated embodiment of the invention there are three separate sets of spaced apart protuberances 50, and the sets of protuberances are situated upon the outer surface of said adjustable or movable element or third annular disc in equally spaced relation to each other. The sets of protuberances are substantially duplicates. The spaced apart protuberances 50 of each set are at different distances from the center of the element or annular disc 49, and are spaced at equal distance apart, radially and circumferentially, in the disclosure as made. The innermost protuberances 50 of the different sets of protuberances are at equal distance from the center of said element or annular disc 49, as are also the second, third, fourth and fifth protuberances, respectively, of the different sets. The protuberances designated "second" of the different sets of protuberances are those next adjacent the inner protuberances, and so on, and the "fifth" protuberances of said different sets are the outermost protuberances. Stated differently, corresponding protuberances of the different sets of protuberances are situated at equal distance from the center of the element or annular disc 49 and at equal distance from each other.

A housing 54 of general bell shape is situated in surrounding relation to the outer end portion of the blower driving shaft 25, as well as in surrounding relation to the flexible bellows 19. More explicitly, the housing 54 includes a reduced outer portion thereof having inwardly extending lugs 55 situated, respectively, in the elongated slots 38 and located at or adjacent to the outer end of said blower driving shaft. The housing 54 can be fixed directly to the blower driving shaft, or outward movement of said housing can be limited by engagement of the lugs 55 with the inner surface of the hollow lock nut 35 when this is turned down, desirably against the outer end of said blower driving shaft. Preferably, the housing 54 will have three lugs 55, including a lug 55 in each elongated slot 38. One of said lugs 55 is clearly disclosed in Fig. 2. Evidently, the housing 54 is fixed by the lugs 55 to rotate with the blower driving shaft 25. The wall of said housing 54 includes spaced apart openings 56, one over each screw 53, for affording ready access to the screws and to the adjustable or movable element or third annular disc 49. The housing 54 also includes an enlarged inner portion thereof defining a ring or circular member 57 integral with the remainder of said housing and disposed concentrically of the axis of the blower driving shaft 25 in considerably spaced relation to said blower driving shaft. Said ring or circular member 57 as shown has a diameter slightly greater than that of the annular discs 41 and 49, which are of about the same diameter, and considerably greater width than that of the annular friction disc 39. The inner or free end 58 of the ring or circular member 57 terminates in a plane perpendicular to the axis of the blower driving shaft 25 and situated in slightly spaced relation to the plane of the adjustable or movable element or third annular disc 49, at the outer side of said element or third annular disc.

The construction includes three levers 59, two of which are disclosed in Fig. 2, there being a lever 59 corresponding to each elongated slot 38. The levers 59 are spaced at equal distance apart and are situated between the ring or circular member 57 of the housing 54 and the third annular disc 49, in engaging relation with protuberances 50. More explicitly, the outer end portion 60 of each lever 59 is of reduced cross-sectional area and is rockingly supported in a notch 61 in the inner or free end 58 of the housing 54, there being three such notches 61 in the illustrated embodiment of the invention, including a notch in radial alinement with each elongated slot 38. Two of said notches 61 are disclosed in Fig. 2. The construction and arrangement are such that interengagement between the reduced outer end portions 60 of the levers 59 and the material of the housing 54 defining the notches 61 precludes removal of said levers from their intended positions in the structure while in operation. That is, said housing 54 precludes outward radial movement of the levers 59, and, together with protuberances 50, confines the outer portions of said levers. The inner end portion 62 of each lever 59 is snugly but slidably situated within the corresponding elongated slot 38, as clearly disclosed in Fig. 2, to be movable along the elongated slot in which situated longitudinally of the blower driving shaft 25. Evidently, the levers 59 are mounted to rotate with said blower driving shaft and the housing 54 when these are rotated.

The side wall 31 of the cup-like member upon the inner anti-friction bearing member 20 integrally supports a plurality, three in the illustrated embodiment of the invention, of equally spaced hook elements or power applying devices 63, including an element or device 63 snugly and slidably situated in each elongated slot 38 at the outer side of each lever 59 in contiguous relation to the inner end portion 62 of the lever, as plainly shown in Fig. 2. Each hook element or power applying device 63 is movable along the elongated slot 38 in which situated longitudinally of the blower driving shaft 25. Said blower driving shaft and the elements or devices 63, together with protuberances 50, confine the inner portions of the levers 59. The construction and arrangement are such that with expansion of the flexible bellows 19 the elements or devices 63 are moved toward the left in Fig. 2 to increase pressure against the inner end portions 62 of the levers 59, and with contraction of said flexible bellows said elements or devices 63 are moved toward the right in said Fig. 2 to reduce pressure against said inner end portions of said levers.

It should be remarked that the electric motor 16 desirably is maintained in continuous operation when the temperature of air in the hood or plenum chamber 13 is at or above a predetermined temperature, as, for example, about 100 degrees Fahrenheit. The mechanism 18 is adapted to render said electric motor 16 operative whenever temperature of air in said hood or plenum chamber at or above said predetermined minimum temperature exists and inoperative whenever temperature of air in the hood or plenum chamber below said predetermined minimum temperature exists, in a manner to be set forth. Preferably, the construction and arrangement are such that when the temperature of air in the hood or plenum chamber reaches said minimum temperature which causes the electric motor to be made operative, or energized, the pressure exerted by the hook elements or power applying devices 63 upon the inner end portions 62 of the levers 59 is insufficient to cause the blower to be operated. That is, said elements or devices 63 are adapted to engage said inner end portions of said levers but lightly when the electric motor 16 is started up, so that the annular disc 41 and the second annular disc 45, as well as the annular friction discs 39 and 46, are under insufficient pressure to cause rotation of the blower driving shaft 25 to occur when the driven pulley 23 is set in operation in response to energization of the electric motor 16. Thus said motor is started up under no load. As the temperature rises in the hood or plenum chamber 13, the flexible bellows 19 is expanded by progressively increasing fluid pressure in said flexible bellows and in the small pipe 36 and the container 37, and the hook elements or power applying devices 63 are actuated toward the left as seen in Fig. 2, thus to cause the inner end portions 62 of the levers 59 to be swung or moved toward the left so that said levers gradually and progressively exert pressure against the protuberances 50 which constitute fulcrums for the levers. Evidently, the housing 54 precludes movement of the outer end portions 60 of the levers 59 toward the right in Fig. 2 when the inner end portions 62 of said levers are swung or moved toward the left. Pressure thus applied to the protuberances or fulcrums 50 obviously causes the annular discs 41 and 45 to be drawn or forced toward each other, thus to cause said annular disc 41 and the bushing 24 to be drawn up against the annular friction disc 39 and said annular disc 45 and the driven pulley 23 to be drawn up against the annular friction disc 46. Stated otherwise, with increase in pressure exerted by the elements or devices 63 against the inner end portions 62 of the levers 59 the annular friction discs 39 and 46, respectively, are more tightly grasped or pressed between the members by which they are engaged, and vice versa. As the friction between said discs 39 and 46 and said members engaging these discs becomes great enough to turn the blower driving shaft 25 in response to rotation of the driven pulley 23 and the bushing 24 by the electric motor 16, said blower driving shaft, together with the housing 54, the cup-like member, the annular discs 41, 45 and 49, the annular friction discs 39 and 46, the levers 59, the hollow nut 32 and the hollow lock nut 35, is rotated, while the flexible bellows 19 is held stationary by the small pipe 36. The outer and inner anti-friction bearing members 20, 20 carry the radial load, said outer bearing member and the hollow nut 32 resist or limit endwise thrust of the flexible bellows 19 toward the right in Fig. 2, and said inner bearing member and the cup-like member, etc., resist or limit endwise thrust of said flexible bellows toward the left in said Fig. 2. Portions of the anti-friction bearing members 20, 20 fixed to the cup-like member and the hollow nut, respectively, rotate with the blower driving shaft, when this is rotated, upon or about portions of said anti-friction bearing members fixed to the opposite ends, respectively, of the flexible bellows 19. Some slippage occurs between the annular friction discs 39 and 46, respectively, and the parts engaged by said annular friction discs throughout the entire range of blower speed up to the point where a predetermined maximum temperature of air in the hood or plenum chamber 13 is reached, when the blower driving shaft is driven at the full speed of the driven pulley 23. As the load is proportional to the speed of the blower, this causes the blower driving shaft 25 to be rotated at speeds which are proportional to the temperature of air in the hood or plenum chamber. The construction and arrangement are such that maximum blower speed can be reached at any predetermined maximum temperature of air in the hood or plenum chamber which may be selected, say, for example, 160 degrees Fahrenheit. Clearly, the rate of rotation of the blower driving shaft 25 will be altered in response to changes in temperature of the heat responsive element of the system to correspond accurately with changes in the temperature of air in the plenum chamber or air duct of said system for all temperatures of said air between a relatively low temperature, say 100 degrees Fahrenheit, which causes the electric motor 16 to be energized and a comparatively higher temperature, say 160 degrees Fahrenheit, which causes the blower driving shaft to be rotated at its maximum speed. The thrust exerted by the flexible bellows 19 to cause the blower to start when a selected relatively low temperature is reached in the hood or plenum chamber, after the electric motor 16 has been set in operation, can be controlled and regulated by adjustment of the hollow nut 32 longitudinally of the blower driving shaft 25, as will be obvious.

The adjustable or movable element or third annular disc 49 and its separate sets of spaced apart protuberances 50, together with the levers 59, constitute the means, hereinbefore mentioned, of the mechanism 17 whereby this mechanism can be adjusted to cause the rate of alteration of the speed of rotation of a blower, actuated by a shaft such as 25, due to temperature changes in a hood or plenum chamber such as 13, including fluid as in the container 37, selectively to be varied. More explicitly, the construction and arrangement are such that the third annular disc 49 can be rotatably adjusted upon the annular disc 41 and fixed thereto to selectively place the innermost, or the second, or the third, or the fourth, or the outermost protuberances 50 of all of the separate or different sets of protuberances in alining and engaging relation to all of the levers 59. Evidently, when the innermost protuberances of the different sets are engaged with said levers 59, the pressure exerted against the annular discs 49 and 41, operating upon said innermost protuberances as fulcrums, due to increase in pressure of fluid in the flexible bellows 19 will be less than when the second protuberances of the different sets are engaged with said levers and this same increase in pressure of fluid in said flexible bellows occurs. Or, stated differently, assuming any given or fixed pressure of fluid in the flexible bellows 19 to exist, the pressure exerted against the annular discs 49 and 41 through the levers 59 by said given or fixed pressure of fluid will, obviously, be less when the innermost protuberances of the different sets of protuberances are engaged with said levers 59 than when the second protuberances of said different sets are engaged with the levers. What has been said with respect to the innermost and second protuberances of the different sets is also true with respect to the second and third protuberances, the third and fourth protuberances and the fourth and outermost protuberances, respectively, of said different sets. Simply stated, the friction of the variable speed drive is adapted to be altered in response to changes in temperature of a heat responsive element, in the hood or plenum chamber 13, thus to alter the speed of rotation of the blower driving shaft 25 through the instrumentality of the mechanism 17 as hereinbefore fully described, and said mechanism 17 includes means, constituted as the adjustable annular disc 49 with protuberances or fulcrums 50 and the levers 59, for accomplishing adjustment of said mechanism 17 so that the rate of alteration of the friction of said variable speed drive due to temperature changes of said heat responsive element selectively can be varied. The rate of alteration of the friction of the variable speed drive will have fixed value when any of the innermost, the second, the third, the fourth, or the outermost protuberances of the different sets of protuberances are engaged with the levers 59 and the system is in operation, but for each of said innermost, second, third, fourth and outermost protuberances of said different sets the fixed value will be different. When the innermost protuberances of the different sets are employed, the rate of alteration of the friction of the drive due to temperature changes will have least value, and when the outermost protuberances of said different sets are employed, the rate of alteration of the friction of said drive due to temperature changes will have greatest value.

The manually adjustable means, including the annular disc 49 with protuberances or fulcrums 50 and the levers 59, is to the purpose that desired and proper speed of the blower employed under varying conditions in commercial practice of the invention can be obtained. That is, with variation of the size of a blower employed, or other variation in the system, there can be adjustment to the obtainment of proper ratio between blower speed and heater temperature. Evidently, the variable speed friction drive must be capable of transmitting more power to bring a large blower to full speed within the usual operating temperature range of air conditioning systems than would be required for a small blower. Not only does the variable speed control of the invention transmit power in direct ratio to the temperature of the plenum chamber, to obviously vary the blower speed, but also said variable speed control, by manual adjustment, varies the rate at which power and speed increase or decrease on a given temperature rise or fall in said plenum chamber, thus to render the apparatus successfully adaptable to employment in air conditioning systems of varying character or capacity. Stated briefly, the manually adjustable means herein illustrated and described is provided to the purpose of adjusting the force of the bellows to the actual power requirement of the blower.

Figure 1:
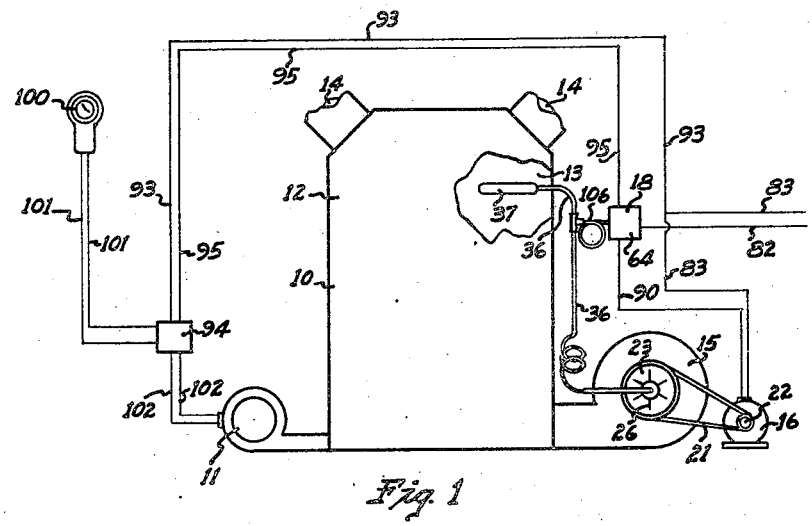
Fig. 1 is a diagrammatic view of an air conditioning system in which the features and characteristics of the invention are incorporated.

The mechanism 18 for rendering each of the electric motor 16 and the burner 11 operative and inoperative in response to temperature changes of the heat responsive element of the system, and for protecting a flexible bellows, such as 19, and/or anti-friction bearing members, such as 20, 20, of said system against the possibility of damage, is very clearly disclosed in Figs. 1 and 5 of the drawings.

A suitably and conveniently mounted casing 64 rigidly supports, as at 65, the lower end of a second flexible bellows 66 situated within said casing. An upstanding insulating block 67 within the casing and at a side of the second flexible bellows 66, in spaced relation to said second flexible bellows, is rigidly secured to said casing, as by an L-bracket 68.

A rectilinear cage 69 within the casing 64 is fixed, as at 70, to the insulating block 67 and is situated directly above and in spaced relation to the second flexible bellows 66. A vertical hollow post 71 situated within the rectilinear cage 69 includes an upper portion thereof which extends snugly but slidably through an opening 72 in the upper wall of said rectilinear cage and an enlarged base 73 thereof which normally rests upon the lower wall of the rectilinear cage. A compression coil spring 74 within the rectilinear cage 69 has its upper end seated against the inner surface of the upper wall of said rectilinear cage and its lower end seated against the upper surface of the enlarged base 73 of the hollow post 71. The coil spring 74 is in surrounding relation to said hollow post and exerts downward pressure against said enlarged base of the hollow post tending to retain this against the lower wall of the rectilinear cage.

A vertical actuating pin or rod 75 is slidably disposed within the hollow post 71 and includes an upper portion thereof extending beyond, or outwardly of, said hollow post, as well as an enlarged lower portion 76 thereof slidably arranged in an opening 77 through the lower wall of the rectilinear cage and normally engaged against or contiguous with the lower surface of the enlarged base 73 of the hollow post 71. The lower end 78 of the actuating pin or rod 75, below the enlarged lower portion 76, is situated within and engages against an insulating button 79 fixed upon the upper end of the second flexible bellows 66. A leaf spring 80 secured, as at 81, upon the insulating block 67 engages against the upper end of the vertical actuating pin or rod 75 and exerts resilient pressure against said pin or rod tending to cause it to slide downwardly through the vertical post 71, directly toward the second flexible bellows 66 and the insulating button 79. In case the lower end 78 of the actuating pin or rod is rigid with the insulating button 79 upon the second flexible bellows 66, in addition to being engaged against said insulating button, the leaf spring 80 can be omitted. When the insulating button is made of some such material as Bakelite, for example, it is preferable to include the leaf spring 80, or equivalent, to positively insure that the actuating pin or rod 75 will move downwardly under pressure with contraction of the second flexible bellows and consequent downward movement of said insulating button.

Incoming lead wires from a source of electrical energy (not shown) are denoted 82 and 83.

The incoming lead wire 82 extends to a double switch element 84 secured, as at 85, upon the rectilinear cage 69, and said double switch element includes an upper resilient contact member 86 thereof which extends freely through an aperture 87 in the insulating block 67 above said cage and a lower resilient contact member 88 thereof which extends freely through an aperture 89 in said insulating block below said cage. Both the contact member 86 and the contact member 88 are in spaced relation to the upper and lower walls, respectively, of the rectilinear cage 69.

The incoming lead wire 83 extends to the electric motor 16, and a lead wire 90 extends from said electric motor to a fixed contact member 91 supported, as at 92, upon the insulating block 67 and situated above and adapted to be removably engaged by the lower resilient contact member 88. A lead wire 93 extends from the incoming lead wire 83 to a relay 94 of the air conditioning system for controlling the burner 11, and a lead wire 95 extends from said relay 94 to a fixed contact member 96 supported, as at 97, upon said insulating block 67 and situated below and adapted to be removably engaged by the upper resilient contact member 86. Desirably, each of the fixed contact members 91 and 96 supports a permanent magnet 98 and each of the resilient contact members 88 and 86 supports an armature 99 for cooperation with the corresponding magnet to the purpose of accomplishing snap action of the switches 88—91 and 86—96.

A room thermostat 100 is suitably connected with the relay 94 by lead wires 101, and said relay is suitably connected with the burner 11 by lead wires 102, in ordinary manner.

The upper resilient contact member 86 has potential tending to urge it upwardly, in direction away from the fixed contact member 96, against tendency of the corresponding magnet and armature to draw said members 86 and 96 together. The upper end portion of the vertical hollow post is arranged in an opening 103 in said upper resilient contact member, and said hollow post includes an enlarged upper end 104 thereof adapted to engage against the upper surface of the upper resilient contact member 86 at location surrounding said opening 103 to retain said upper resilient contact member down in engagement with the fixed contact member 96 when the compression coil spring 74 is retaining the enlarged base 73 of the hollow post 71 in engagement with the lower wall of the rectilinear cage 69, as disclosed in Fig. 5. Upon upward movement of said hollow post from its position as in said Fig. 5, the upper contact member 86 is adapted to move upwardly, due to its resiliency, and become disengaged from the fixed contact member 96.

The lower resilient contact member 88 has potential tending to urge it upwardly, in direction toward the fixed contact member 91. The lower end 78 of the vertical hollow post 71 is arranged in an opening 105 in said lower resilient contact member, and the enlarged portion 76 of said hollow post is adapted to engage against the upper surface of the lower resilient contact member 88 at location surrounding said opening 105. When said enlarged portion 76 of the actuating pin 75 is up against the enlarged base 73, as disclosed in Fig. 5, or above the elevation as in said Fig. 5, the leaf spring 80 is flexed upwardly and the lower contact member 88, due to its resiliency, is retained in engagement with the fixed contact member 91. Upon downward movement of said actuating pin from its position as in Fig. 5, by resilient action of the leaf spring 80, or downward movement of the insulating button 79, or both, said lower resilient contact member is adapted to be moved downwardly, against tendency of the corresponding magnet and armature to draw said members 88 and 91 together, and become disengaged from the fixed contact member 91.

A small pipe 106 connects the small pipe 36 with the second flexible bellows 66, and the pressure of fluid which exists from time to time in the flexible bellows 19 also exists in said second flexible bellows 66. That is, the pressure of fluid in the flexible bellows 19 and 66 is always substantially the same.

Said second flexible bellows 66 is disclosed in Fig. 5 as under pressure of fluid to be sufficiently expanded to cause the contact members 88 and 91 included in the circuit for the electric motor 16 to be closed. This is the condition of the switch 88—91 whenever the temperature of air in the hood or plenum chamber 13 is at or above the predetermined minimum temperature, say about 100 degrees Fahrenheit, intended to cause the electric motor to be in operation. Whenever the temperature of air in said hood or plenum chamber is below said mentioned predetermined minimum temperature, the second flexible bellows will be less expanded, or more contracted, than in said Fig. 5 thus to cause the insulating button 79 to be depressed and the switch 88—91 to become disengaged in the general manner as above set forth. Assuming the temperature of air in the hood or plenum chamber 13 to be below the temperature at which the electric motor 16 is intended to be operative, the second flexible bellows 66 will be contracted somewhat from its size as in Fig. 5 to cause or permit the actuating pin or rod 75 to be at lower position than that in which shown in said Fig. 5 to retain the switch 88—91 in open position. Assuming the temperature of air in said hood or plenum chamber then to be elevated to the temperature at which said electric motor is intended to become operative, said second flexible bellows will become sufficiently expanded, as in said Fig. 5, to cause said switch 88—91 to be closed against but relatively slight tendency of the leaf spring 80 to move the member 88 to open position. Whenever the actuating pin or rod 75 is at or above its elevation as in said Fig. 5, the switch 88—91 controlling the electric motor circuit will remain closed, and whenever said actuating pin or rod is below its elevation as in Fig. 5 said switch 88—91 will remain open.

The construction and arrangement, or devices, of the mechanism 18 for affording protection to the flexible bellows 19 and the anti-friction bearing members 20, 20, against the possibility that these might, or could, otherwise become damaged during practical operation of the air conditioning system, function in the manner now to be set forth. Pressure of fluid in the second flexible bellows 66 and having tendency toward causing the compression coil spring 74 to be collapsed is exerted against said compression coil spring through the medium of the insulating button 79, the lower end 78 and the enlarged lower portion 76 of the actuating pin or rod 75, and the enlarged base 73 of the vertical hollow post 71. Said compression coil spring 74 is of sufficient strength to withstand, without collapsing, pressure of fluid in said second bellows 66 which prevails when the temperature of air in the hood or plenum chamber 13 has reached the predetermined maximum temperature selected, hereinbefore suggested by way of example as 160 degrees Fahrenheit, at which the blower driving shaft 25 is adapted to be driven at full speed by the driven pulley 23, and to collapse, or partially collapse, when the temperature of air in said hood or plenum chamber rises higher than said mentioned predetermined maximum temperature. When the annular disc 41 and the bushing 26 are drawn up tight against the annular friction disc 39 and the annular disc 45 and the driven pulley 23 are drawn up tight against the annular friction disc 46, as is the case when said driven pulley causes the blower driving shaft to be driven at full speed, the flexible bellows 19 will have expanded to its maximum possible size. Further tendency of said flexible bellows 19 toward expanding, due to rise of temperature of air in the hood or plenum chamber above the predetermined maximum temperature which causes the driven pulley 23 and the blower driving shaft 25 to be tightly clutched together, will obviously be liable to cause this flexible bellows and the anti-friction bearing members 20, 20 associated therewith to become damaged unless some such provision as herein contemplated is made to the contrary. Evidently, the compression coil spring 74 is caused to collapse, or partially collapse, due to elevation of temperature of air in the hood or plenum chamber above the temperature which causes the driven pulley and blower driving shaft to be tightly clutched together, by expansion imparted to the second flexible bellows 66 after the flexible bellows 19 has been expanded to its maximum possible size. In short, pressure which would otherwise be applied to said flexible bellows 19 after it has expanded to the fullest extent possible is applied instead to the flexible bellows 66 which can, and does, expand, to cause pressure in the flexible bellows 19 to be relieved, by accomplishing compression of the coil spring 74. The temperature of the container 37 and its enclosed expansible fluid, situated within the hood or plenum chamber, will of course be considerably higher than the temperature of the flexible bellows 19 and 66 and their enclosed expansible fluid, situated in more or less remote relation to said hood or plenum chamber, especially when the temperature of air in the hood or plenum chamber is elevated sufficiently to cause the compression coil spring 74 to be partially or totally collapsed, and the mass or actual quantity of expansible fluid enclosed in the container 37 when at relatively high temperatures will be small compared to the mass or actual quantity of expansible fluid enclosed in the much cooler second flexible bellows 66, for the reason that heat applied to said container by air at higher temperatures in said hood or plenum chamber will cause a major portion of the bulk of expansible fluid to be expelled from or driven out of said container. In practical operation of the air conditioning system, the condition will be made such that the compression coil spring 74 will not become completely collapsed and the second flexible bellows 66 will not become expanded to the fullest extent possible even when all, or substantially all, of the expansible fluid has been forced out of the container 37. Thus, the second flexible bellows 66 will provide real protection for the flexible bellows 19 and the anti-friction bearing members 20, 20, even should the temperature of air in the hood or plenum chamber become excessively elevated above the temperature at which the compression coil spring 74 is adapted to commence collapsing.

The burner 11 is controlled by the relay 94, and said relay is controlled by the circuit including the incoming lead wires 82 and 83 and the switch 86—96. The relay 94 is adapted to cause the burner 11 to be operative when the switch 86—96 is engaged and to be inoperative when said switch 86—96 is disengaged. Whenever the hollow post 71, and hence the actuating pin or rod 75, is at or below its elevation as in Fig. 5, the switch 86—96 will be closed, and whenever said hollow post is above its elevation as in said Fig. 5, said switch 86—96 will be open, as hereinbefore has been mentioned. The hollow post 71 will remain at or below the elevation in which shown in Fig. 5 at all times during practical operation of the air conditioning system except when the compression coil spring 74 is caused to collapse, or partially collapse, due to elevation of temperature of air in the hood or plenum chamber above the predetermined maximum temperature of air which causes the driven pulley 23 and the blower driving shaft 25 to be tightly engaged so that said blower driving shaft is operated at the full speed of said driven pulley, as hereinbefore also has been set forth. Evidently, the burner 11 will remain operative at all times except when the compression coil spring is collapsed, or partially collapsed, due to the existence of really high temperature in the hood or plenum chamber. The construction and arrangement desirably will be such that said burner 11 will be rendered inoperative, by collapse of the compression coil spring 74 due to elevation of temperature of air in said hood or plenum chamber, at temperature somewhat above that which causes the blower driving shaft to be advanced at full speed. By way of example, supposing said blower driving shaft to become operative at full speed when the temperature of air in said hood or plenum chamber is elevated to, say, 160 degrees Fahrenheit, it may be desirable that the compression coil spring 74 be constructed to become collapsed when, and if, the temperature of air in the hood or plenum chamber is elevated to, say, about 180 degrees Fahrenheit, thus to cause said burner to be rendered inoperative. In any event, the construction and arrangement will be such that the burner 11 will be rendered inoperative before an excessively high temperature of air possibly can exist in said hood or plenum chamber. As long as the temperature of air in the hood or plenum chamber remains at or above the temperature which causes, or permits, the burner to become inoperative said burner will, obviously, remain inoperative. It should be noted that the blower will be operative at all times when the compression spring 74 is collapsed and the burner is as a consequence inoperative, thus to cause heated air to be conveyed from the hood or plenum chamber through the outlet ducts 14 after said burner has ceased to function.

As will be apparent, it is suitable and convenient that pressure of fluid in the flexible bellows 19 be relieved at about the same time cessation of operation of the burner 11 is accomplished. In the disclosure as made, collapse of the compression coil spring 74 permits pressure of fluid in said flexible bellows 19 to be relieved and substantially concurrently permits the switch 86—96 to become disengaged. In any instance where intended, commencement of collapsing action of the compression coil spring 74 could cause or permit relief of pressure at the bellows 19 and continued collapsing action of said compression coil spring could later cause or permit disengagement of the switch 86—96, so that relief or pressure at said bellows would occur earlier than and in response to less pressure than disengagement of said switch 86—96 would be accomplished. For instance, assuming the blower driving shaft to become full speed when air in the hood or plenum chamber reached a temperature of 160 degrees, pressure at the bellows 19 could be relieved when said air reached a temperature but slightly higher than 160 degrees, and the switch 86—96 could be disengaged when said air reached a much higher temperature, say, for example, 180 degrees.

Fig. 4 discloses a construction and arrangement, or devices, of modified form which can be incorporated into the mechanism 17, detailed in Fig. 2, and there employed to afford protection for the bellows 19 and the bearing members 20, 20 against the possibility these might, or could, otherwise become damaged. Parts incorporated in said Fig. 4 which are similar or equivalent to parts included in said Fig. 2 bear the same reference numerals each followed by a prime, and the structures as in Figs. 2 and 4 may be identical except in the particulars hereinafter recited.

The side wall 31' of the cup-like member of Fig. 4 integrally supports, in lieu of the hook elements or power applying devices 63 as in Fig. 2, equally spaced, outwardly and perpendicularly extending flanges 107, including a flange 107 at the outer side of each lever 59' in spaced relation thereto. Horizontal posts 108 are slidably mounted in the flanges 107 in perpendicular and alining relation to the levers 59', and each post 108 includes an enlarged base 109 upon its inner end adapted to become engaged with a corresponding lever 59' when a flexible bellows, such as 19, is expanded. A compression coil spring 110 upon and about each post 108 has its outer end seated against the inner surface of the corresponding flange 107 and its inner end seated against the outer surface of the corresponding enlarged base 109. Nuts 111 upon the outer ends of the posts 108 and engaged against the outer surfaces of the flanges 107 limit inward movement of said posts, in direction toward the levers 59'.

It will be seen that the disclosure of the application presents a control for an air conditioning system having a unitary thermal construction and arrangement for actuating both a blower motor control switch and a burner control switch, as well as for actuating a variable speed mechanism. Actuation of the blower motor control switch and the variable speed mechanism by employment of the unitary thermal mechanism illustrated and described insures perfect co-ordination of the starting and stopping of the motor and the variations in speed of the blower, as will be apparent. At the same time, the disclosure herein provides relief for the bellows of the thermal construction and arrangement adapted to prevent injury to the apparatus in case the bellows should be subjected to abnormally high temperatures.

When the flanges 107 are actuated toward the left as seen in Fig. 4 due to expansion of the flexible bellows employed, the enlarged bases 109 of the posts 108 engage the levers 59' under pressure in about the manner as set forth in connection with the elements or devices 63, thus to cause the inner end portions 62' of said levers to be swung or moved toward the left so that the levers 59' function in about the manner as stated in connection with the levers 59. The compression coilsprings 110 are of sufficient strength to withstand, without collapsing, pressure of fluid in the bellows employed which prevails when the temperature of air in the hood or plenum chamber has reached the predetermined maximum temperature selected at which the blower driving shaft 25' is adapted to be clutched tight to the driven pulley and thus operated at full speed, and to collapse, or partially collapse, when the temperature of air in said hood or plenum chamber rises higher than said mentioned predetermined maximum temperature. In the instance of the disclosure of Fig. 4, the flexible bellows, such as 19, employed will not have expanded to its maximum size when the blower driving shaft and the driven pulley have tightly clutched. Instead, said flexible bellows will be constructed to be capable of having additional expansion in proportion as the compression coil springs 110 collapse. Evidently, such additional expansion will cause pressure which would otherwise exist in the flexible bellows to be relieved. In practical operation, the condition will be such that said compression coil springs 110 will not become completely collapsed and said flexible bellows will not become expanded to the fullest extent possible even when all, or substantially all, of the expansible fluid has been forced out of the container, such as 31, in the hood or plenum chamber of the air conditioning system.

The construction and arrangement, or devices, as in Fig. 4 for causing pressure to be relieved in the flexible bellows 19 obviously can be employed either when the construction and arrangement, or devices, as in Fig. 5 for accomplishing the same purpose are also employed as parts of the air conditioning system, or are omitted.

It will be understood that the construction and arrangement hereinbefore described, including the container 31, for enclosing the expansible fluid employed in the air conditioning system is what is commonly known in the art as "limited fill." That is, the bellows and capillary tube and a portion of the container are solidly filled with liquid. When the container is subjected to rising temperature this liquid is vaporized creating a pressure therein, and as the bellows expand solid liquid is forced out of the container until only vapor is left.

The principles of the invention are applicable to various types of air heating and cooling systems.

What is claimed is:

1. In an air conditioning system, an electric motor, a blower adapted to be driven, a driving shaft for said blower, a pulley freely revolvable on said shaft and operatively connected to said motor, a variable speed drive for connecting said pulley to said shaft to drive said blower at a multiplicity of different speeds, heat responsive mechanism including an expansible bellows for actuating said drive, lever means operable by said bellows for changing the friction of said drive to alter the speed of said blower in accordance with changes in temperature of said heat responsive mechanism, manually adjustable means for causing the rate of alteration of the speed of said blower due to temperature changes of said heat responsive mechanism selectively to be varied, and means for adjusting the normal position of said bellows relatively to said drive.

2. In an air conditioning system, a motor, a blower adapted to be driven, a variable speed friction drive for connecting said motor to said blower, a heat responsive element, mechanism for altering the friction of said drive in response to changes in temperature of said heat responsive element thus to alter the speed of said blower, and manually adjustable means for causing the rate of alteration of the friction of said drive due to temperature changes of said heat responsive element selectively to be varied.

3. In an air conditioning system, a motor, a blower adapted to be driven, a variable speed friction drive for connecting said motor to said blower, a heat responsive element, mechanism for altering the friction of said drive in response to changes in temperature of said heat responsive element thus to alter the speed of said blower, and means including a lever constituted as a part of said mechanism and a member manually adjustable relatively to said lever for causing the rate of alteration of the friction of said drive due to temperature changes of said heat responsive element selectively to be varied.

4. In an air conditioning system, a motor, a blower adapted to be driven, a variable speed friction drive for connecting said motor to said blower, a heat responsive element, mechanism for altering the friction of said drive in response to changes in temperature of said heat responsive element thus to alter the speed of said blower, and means including a lever constituted as a part of said mechanism and a manually adjustable member having a plurality of fulcrums adapted selectively to be engaged with said lever at different locations thereof for causing the rate of alteration of the friction of said drive due to temperature changes of said heat responsive element selectively to be varied.

5. In combination, a motor, a device adapted to be driven, variable speed friction drive for connecting said motor to said device, heat responsive mechanism including an expansible and contractible means for causing the friction of said drive to be altered to alter the speed of said device in accordance with changes in temperature of said expansible and contractible means, and manually adjustable means for causing the rate of alteration of the friction of said drive due to temperature changes of said expansible and contractible means selectively to be varied.

6. In combination, a motor, a device adapted to be driven, a variable speed friction drive for connecting said motor to said device, heat responsive mechanism including an expansible and contractible means for causing the friction of said drive to be altered to alter the speed of said device in accordance with changes in temperature of said expansible and contractible means, and manually adjustable means including a lever for causing the rate of alteration of the friction of said drive due to temperature changes of said expansible and contractible means selectively to be varied.

7. In combination, a motor, a device adapted to be driven, a variable speed friction drive for connecting said motor to said device, heat responsive mechanism including an expansible and contractible means for causing the friction of said drive to be altered to alter the speed of said device in accordance with changes in temperature of said expansible and contractible means, and means including a plurality of levers constituted as parts of said mechanism and a manually adjustable member having a plurality of fulcrums adapted selectively to be engaged with each of said levers at different locations of the levers for causing the rate of alteration of the friction of said drive due to temperature changes of said expansible and contractible means selectively to be varied.

8. In an air conditioning system, a motor, a blower adapted to be driven, a variable speed friction drive for connecting said motor to said blower, a heat responsive element, lever means operable by changes in temperature of said heat responsive element for altering the friction of said drive thus to alter the speed of said blower, and manually adjustable means for causing the rate of alteration of the friction of said drive due to temperature changes of said heat responsive element selectively to be varied.

9. In an air conditioning system, a motor, a blower adapted to be driven, a variable speed friction drive for connecting said motor to said blower, heat responsive mechanism including an expansible member for actuating said drive, means operable by said expansible member for altering the friction of said drive in accordance with changes in temperature of said heat responsive mechanism thus to alter the speed of said blower, and manually adjustable means for causing the rate of alteration of the friction of said drive due to temperature changes of said heat responsive mechanism selectively to be varied.

10. In an air conditioning system, a plenum chamber, a blower for forcing air through said chamber, an electric motor, a circuit for said motor, a variable speed friction drive for connecting said motor to said blower, heat responsive mechanism including a control element in said chamber and flexible means enclosing an expansible fluid adapted to cause said flexible means to be under decreased pressure with lowering of the temperature of the control element and under increased pressure with raising of the temperature of said control element, means operable by said flexible means for decreasing the friction of said drive with decrease of the temperature of the control element and for increasing the friction of said drive with increase of the temperature of said control element, and a switch at least partially controlled by said flexible means for causing said motor circuit to be open whenever the control element is below a predetermined temperature and to be closed whenever said control element is at or above said predetermined temperature.

11. In combination, a device adapted to be driven, an electric motor, a circuit for said motor, a variable speed friction drive for connecting said motor to said device, heat responsive mechanism including flexible means enclosing an expansible fluid adapted to cause said flexible means to be under decreased pressure with lowering of the temperature of said expansible fluid and under increased pressure with raising of the temperature of the expansible fluid, means operable by said flexible means for decreasing the friction of said drive with decrease of the temperature of said expansible fluid and for increasing the friction of said drive with increase of the temperature of the expansible fluid, and a switch for causing said motor circuit to be open whenever said expansible fluid is below a predetermined temperature and to be closed whenever the expansible fluid is at or above said predetermined temperature.

12. In combination, a burner, a control circuit for said burner, a switch for said control circuit, a device adapted to be driven, an electric motor, a variable speed friction drive for connecting said motor to said device, and heat responsive mechanism including an expansible and contractible means for causing the friction of said drive to be altered to alter the speed of said device in accordance with changes in temperature of the expansible and contractible means, said expansible and contractible means being adapted to cause said switch to be in the closed condition of said control circuit in response to lowering of the temperature of the expansible and contractible means and in the open condition of the control circuit in response to raising of the temperature of said expansible and contractible means.

13. In combination, a burner, a control circuit for said burner, a switch for said control circuit, a device adapted to be driven, an electric motor, a control circuit for said motor, a switch for said last mentioned control circuit, a variable speed drive for connecting said motor to said device, and heat responsive mechanism including an expansible and contractible means for causing the friction of said drive to be altered to alter the speed of said device in accordance with changes in temperature of the expansible and contractible means, said expansible and contractible means being adapted to cause the switch for the burner control circuit to be in closed condition in response to lowering of the temperature of the expansible and contractible means and in open condition in response to raising of the temperature of said expansible and contractible means and to cause the switch for the motor control circuit to be in open condition in response to lowering of the temperature of the expansible and contractible means and in closed condition in response to raising of the temperature of said expansible and contractible means.

14. In combination, a device adapted to be driven, an electric motor, a control circuit for said motor, a switch for said control circuit, a variable speed friction drive for connecting said motor to said device, and heat responsive mechanism including an expansible and contractible means for causing the friction of said drive to be altered to alter the speed of said device in accordance with changes in temperature of the expansible and contractible means, said expansible and contractible means being adapted to cause said switch to be in the open condition of said control circuit in response to lowering of the temperature of the expansible and contractible means and in the closed condition of the control circuit in response to raising of the temperature of said expansible and contractible means.

15. In combination, a motor, a device adapted to be driven, a variable speed drive including frictionally engaged members for connecting said motor to said device, heat responsive mechanism including a control element and a flexible member enclosing an expansible fluid adapted to cause said flexible member to be under decreased pressure with lowering of the temperature of the control element and under increased pressure with raising of the temperature of said control element, means operable by said flexible member for increasing the friction between the members of said drive with increase of the temperature of said control element, means through the instrumentality of which the fluid capacity of said heat responsive mechanism can be enlarged when the temperature of said control element is raised beyond a predetermined high temperature adapted to cause the frictionally engaged members of said drive to tightly grasp each other, a burner, a control circuit for said burner, and a switch for said control circuit normally in the closed condition of the control circuit, enlargement of the fluid capacity of said heat responsive mechanism being adapted to cause said switch to be moved to the open condition of said control circuit.

EVERETT H. WHITE.